Nov. 18, 1969　　　T. A. STRID　　　3,478,905
CONVEYOR FOR BULK GRAIN HAULING VEHICLES
Filed May 31, 1968　　　　　　　　　　　6 Sheets-Sheet 3

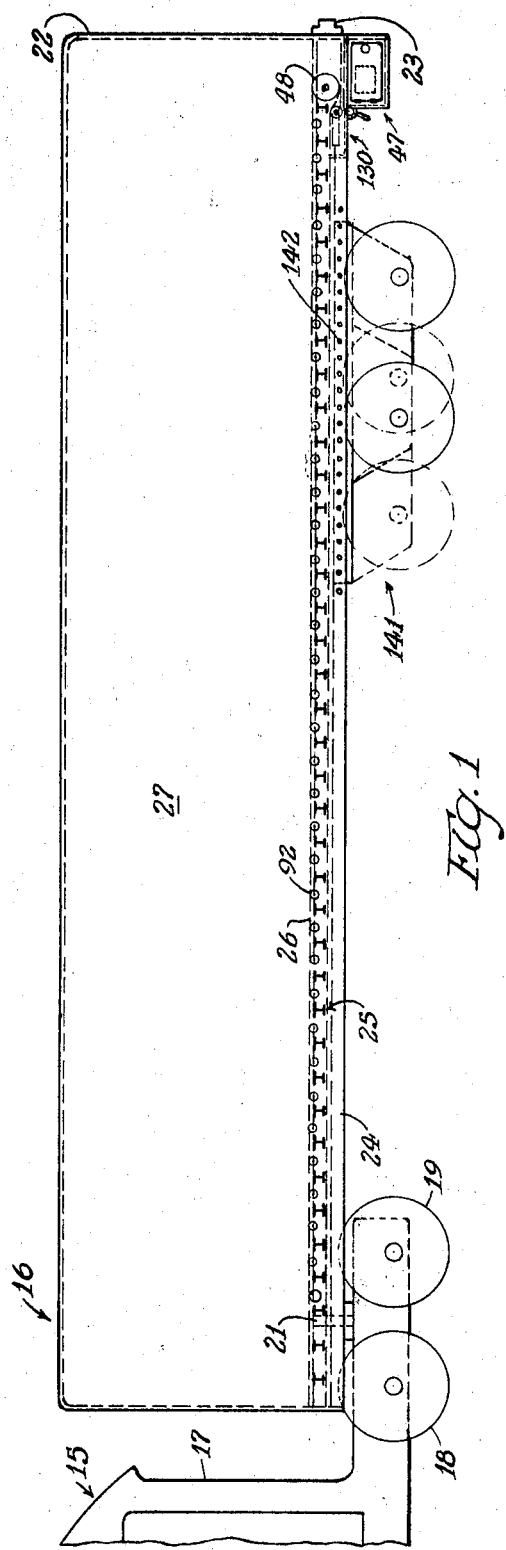

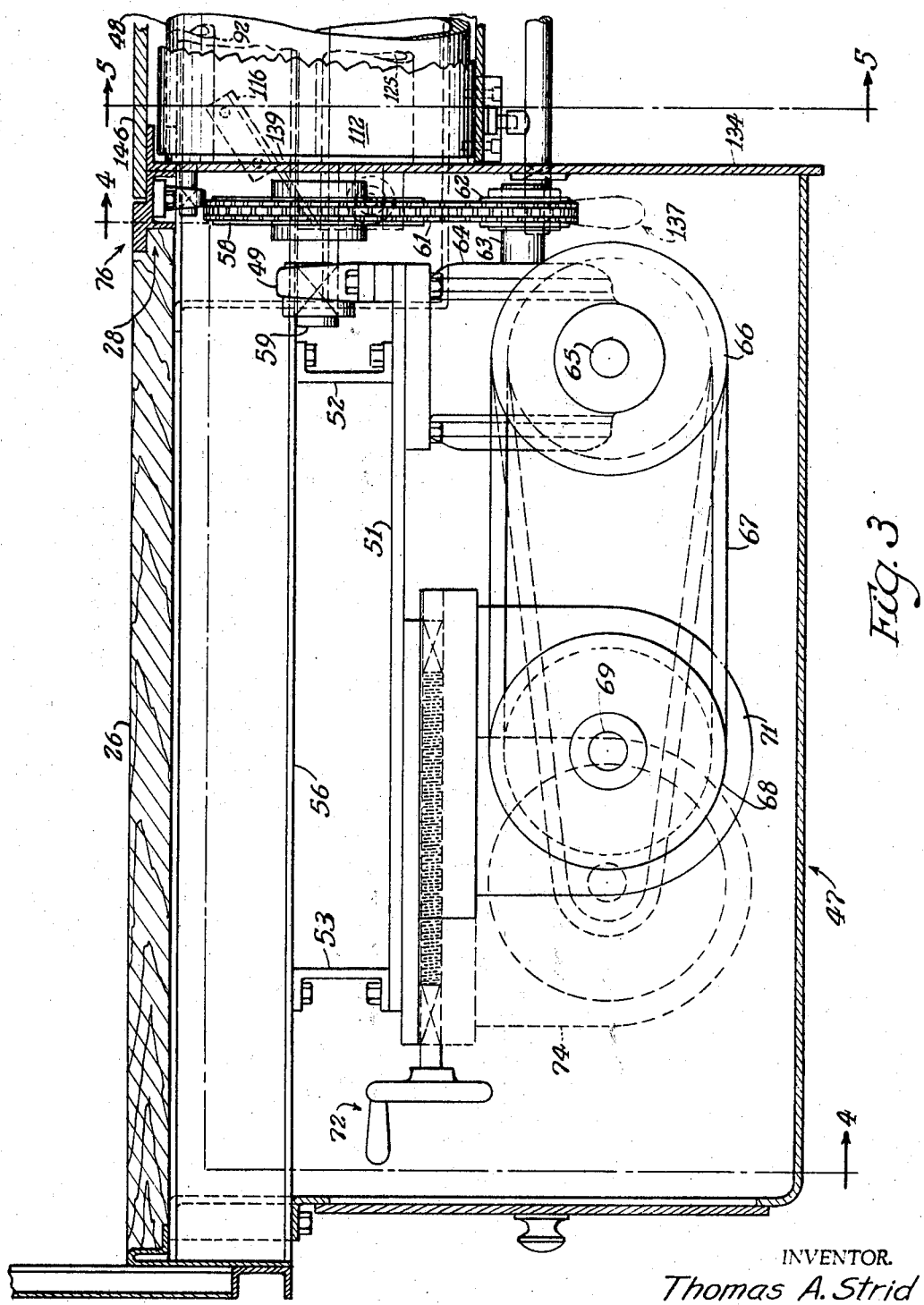

INVENTOR.
Thomas A. Strid
BY Stanley Binish
ATTORNEY

Nov. 18, 1969     T. A. STRID     3,478,905
CONVEYOR FOR BULK GRAIN HAULING VEHICLES
Filed May 31, 1968     6 Sheets-Sheet 4
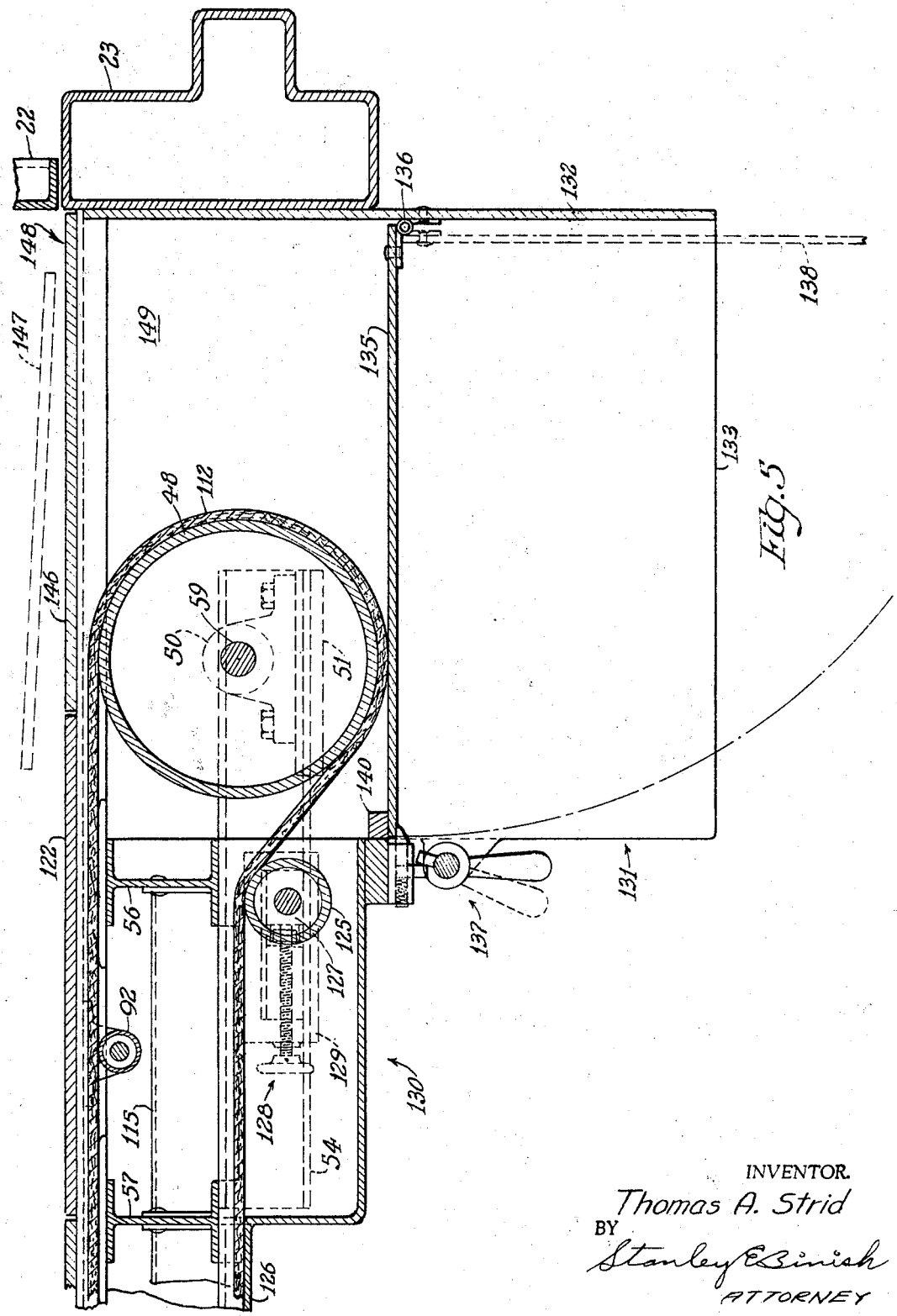
INVENTOR.
Thomas A. Strid
BY
Stanley E. Binish
ATTORNEY

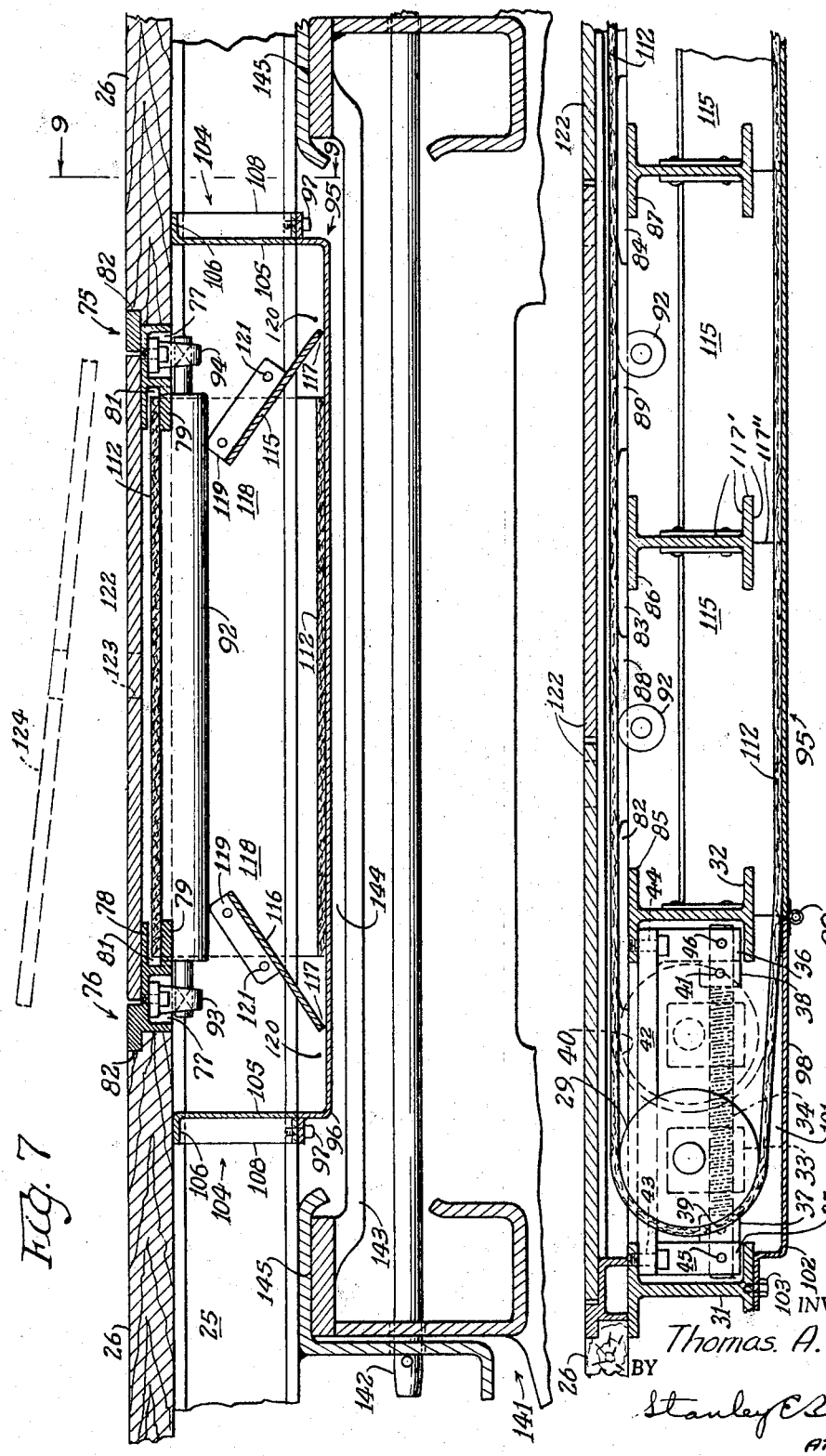

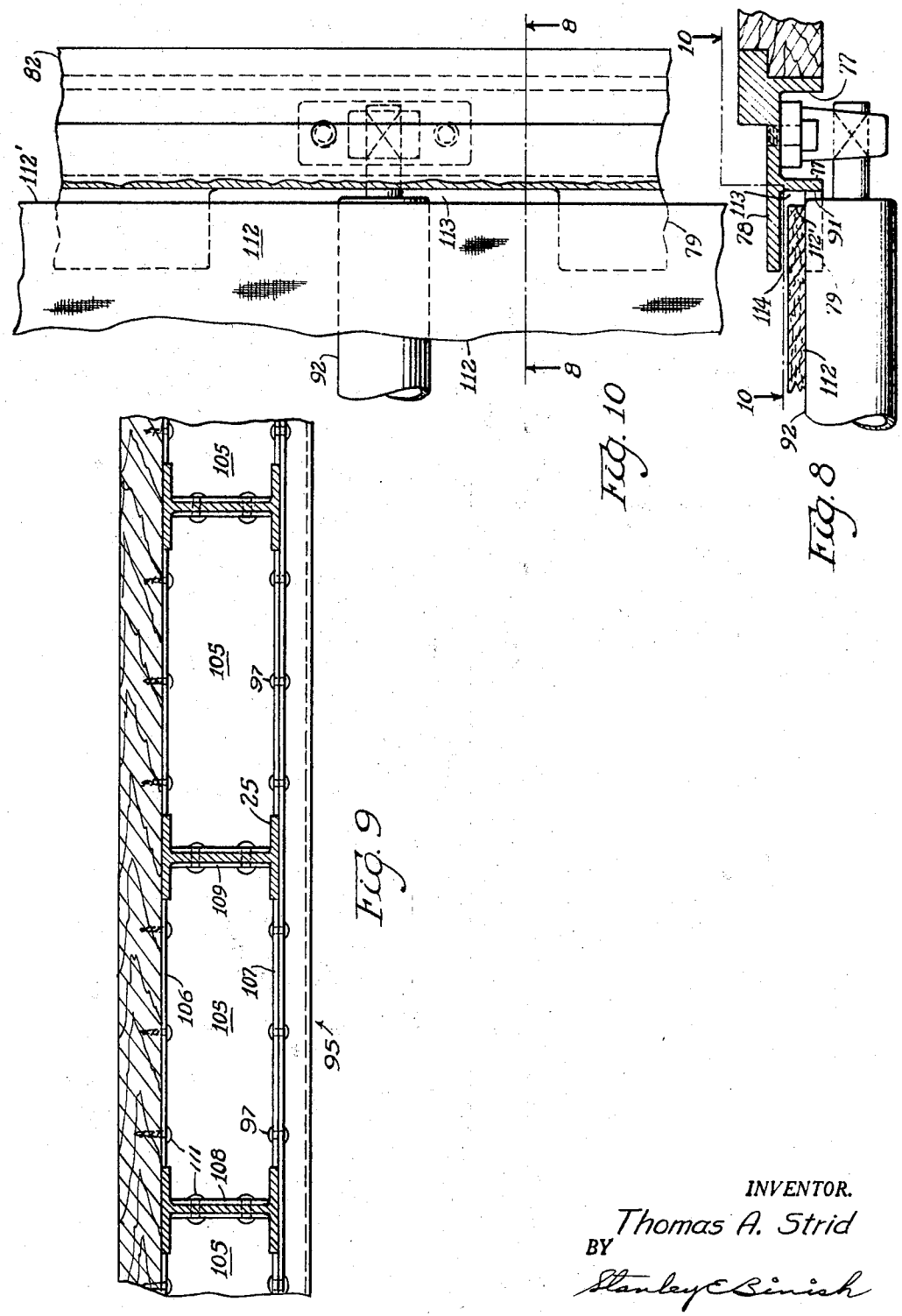

United States Patent Office 3,478,905
Patented Nov. 18, 1969

3,478,905
CONVEYOR FOR BULK GRAIN HAULING VEHICLES
Thomas A. Strid, 2349 Jourdain Lane,
Green Bay, Wis. 54301
Filed May 31, 1968, Ser. No. 733,513
Int. Cl. B60p 1/38
U.S. Cl. 214—83.18                     11 Claims

ABSTRACT OF THE DISCLOSURE

A conveyor built into the floor of bulk hauling vehicles, having deflector plates for receiving leakage grain from the upper working run of the belt, deflecting such grain away from the lower return run of the belt, and depositing such grain into a receptacle for disposal.

BACKGROUND

The purpose of this invention is the provision of a bulk unloading conveyor, built into the floor of a trailer, that eliminates the problem of encrustation, fouling, and harmful build-up of commodity such as squashed grain, feed, meal, or the like, on the underside of the conveyor belt and on the drive and supporting pulleys thereof, caused by the leaking or spilling of such commodity from the working run of a conveyor belt onto the lower return of the conveyor belt.

SUMMARY

An object of this invention is the provision of a conveyor, built into the floor of a bulk hauling vehicle, having means disposed to intercept any commodity such as grain leaking or spilling from the upper working run of the conveyor belt.

Another object is to provide a conveyor, built into the floor of a bulk hauling vehicle, having deflector means disposed to intercept any commodity such as grain leaking or spilling from the upper run of the conveyor belt and directing such grain away from the lower return run of the conveyor belt.

A further object of this invention is the provision of a conveyor, built into the floor of a bulk hauling vehicle, having deflector means disposed to intercept any commodity such as grain leaking or spilling from the upper run of the conveyor belt, directing such grain away from the lower return run of the conveyor belt, and depositing such leakage grain into a receptacle.

Still another object is the provision of a conveyor, built into the floor of a bulk hauling vehicle, having baffle flange means disposed closely adjacent and over the side edge portions of the upper working run of the conveyor belt to baffle and check the escape of bulk grain commodity thereby.

Still a further object is to provide a conveyor, built into the floor of a bulk hauling vehicle, having guideway means for receiving and supporting the side edge portions of the upper run of the conveyor belt, the upper flange of the guideway means functioning as a baffle to prevent the escape of grain thereby, and the lower flange of the guideway means being discontinuous and interrupted to allow any baffle leakage grain to fall through the open sections in said interrupted lower flange.

Yet another object of this invention is the provision of a conveyor, built into the floor of a bulk hauling vehicle, having guideway means for receiving, baffling and supporting the side edge portions of the upper run of the conveyor belt, the guideway means having an opening through which baffle leakage grain can fall through, and having deflector means to receive such leakage grain and convey such leakage grain away from the lower return run of the conveyor belt.

Other specific objects and many of the attendant advantages of this invention will be readily appreciated as the same becomes better understood by reference to the following detailed description when considered in connection with the accompanying drawings in which like reference numerals designate like parts throughout the figures thereof and wherein:

DRAWING

FIG. 1 is a side elevation view of a trailer connected to a tractor, and showing generally a conveyor installed in the floor of the trailer;

FIG. 2 is a plan view of the trailer shown in FIG. 1, showing the position of the conveyor drive means for the head pulley of the conveyor;

FIG. 3 is an enlarged fragmentary section view taken on line 3—3 of FIG. 2, showing the conveyor drive means and head pulley in detail, at the head end of the conveyor;

FIG. 5 is a fragmentary section view taken on line 5—5 of FIG. 3;

FIG. 6 is an enlarged fragmentary section view taken on line 6—6 of FIG. 1, showing the tail end portion of the conveyor;

FIG. 7 is an enlarged fragmentary section view taken on line 7—7 of FIG. 1, showing the deflector structure, and the conveyor structure relation to the sliding tandem type of a trailer tandem assembly;

FIG. 8 is an enlarged fragmentary view taken on line 8—8 of FIG. 2, showing one of the irregular section beams disposed along the side edges of the slot, illustrating the beams compound structure and a portion of the conveyor belt associated therewith;

Figure 4:
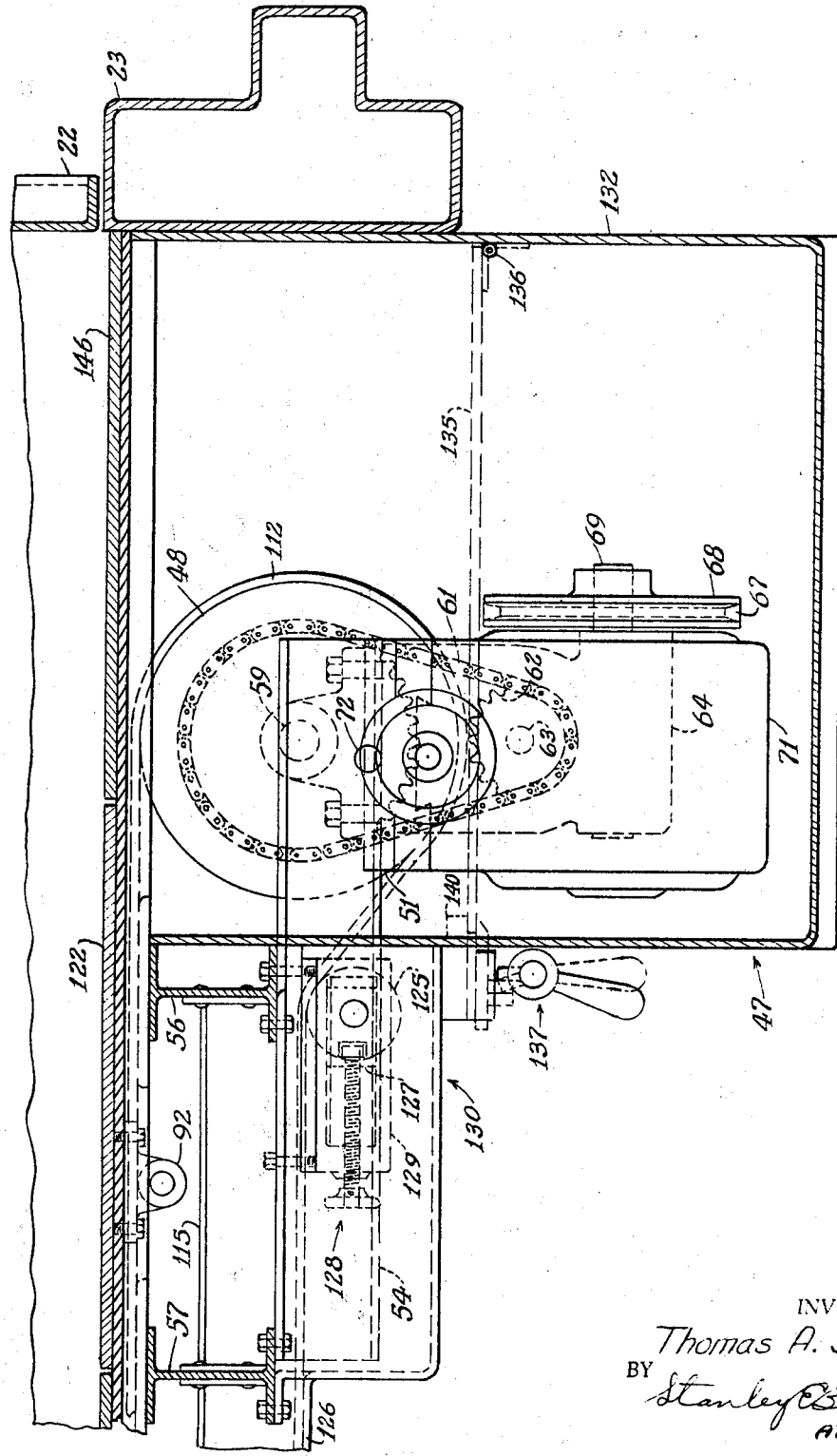
FIG. 4 is an enlarged fragmentary section view taken on broken line 4—4 of FIG. 3.

FIG. 9 is an enlarged fragmentary elevation view taken on line 9—9 of FIG. 7 showing the side wall structure of the conveyor housing and illustrating the configuration of the elemental side walls adapted to fit tightly between the adjacent floor crossbeams; and FIG. 10 is a fragmentary plan view taken on line 10—10 of FIG. 8, showing the grain leakage space provided between the edge of the belt and the rearward margin of the cut-away portions of the lower flange.

DESCRIPTION

The invention is applicable to vehicles of many types such as trucks, trailers, tractor-trailers, or the like, the selected embodiment disclosing the tractor-trailer combination for exemplification only.

Referring now to the drawings, wherein like reference characters designate like or corresponding parts throughout the several views, there is shown in FIG. 1, a tractor generally indicated at 15 and an enclosed trailer 16.

The tractor includes a cab 17, drive wheels 18, and tag axle wheels 19. The front end of the trailer is supported on the tractor by conventional fifth wheel and king pin means indicated at 21.

The tractor 15 and trailer 16 may be considered as conventional vehicles and will not be described in detail herein, the trailer being merely adapted to include the present improved conveyor means. The trailer can be unhitched from the tractor and the front end supported by conventional parking wheel means (not shown).

Entrance into the trailer is accomplished through a door or gate at the rear of the trailer, such as indicated at 22.

The customary bumper 23 is provided at the rear end of the trailer.

The trailer includes longitudinal main frame beams such as indicated at 24, a plurality of equally spaced cross-beams supported thereby such as indicated generally at 25, a floor or deck 26 supported on said cross beams, and enclosure sides such as indicated at 27, said sides comprising part of the main frame beams.

One of the advantages of the present improved conveyor is the construction which permits it to be manufactured and delivered in parts and thence readily installed in a conventional vehicle without making any substantial changes in the vehicle framework or chasis. An elongated section generally indicated at 28 is removed from the floor, at the longitudinal center-line of the trailer, to accommodate the conveyor being installed and mounted therein. In the formation of slot 28 only a portion of the trailer floor is removed, the supporting floor crossbeams are retained intact.

The conveyor structure includes a belt tightener means comprising a shafted tail pulley 29, see FIG. 6, disposed at the forward end of slot 28, between crossbeams 31 and 32, and journalled in spaced bearing blocks such as indicated at 33.

The bearing blocks 33 are supported on elongated feed-screws such as indicated at 34 which are journalled at their ends in spaced bearings 35 and 36. The bearing blocks 33 are bored and threaded to threadedly receive said rotary feed-screws therethrough. Collar 37 and 38 and associated set screws 39 and 41 therefor are provided at each end of said feed-screws 34 to prevent endwise movement of the feed-screws 34.

The spaced bearings 35 and 36 are integrally mounted on base 42 which base in turn is mounted depending from the upper flanges of crossbeams 31 and 32 by means of bolts such as indicated at 43 and 44. Set screws 45 and 46 are engageable with the feed-screws to prevent unwanted rotary motion thereof. The above shafted tail pulley 29 and supporting structure comprises the belt tightener means, the tail pulley and its bearing blocks being movable and adjustable along the rotatable feed-screw in the well known conventional manner, from solid line pulley position 29 to dotted line position 40, to control the tension of a belt, trained over said tail pulley 29, to be hereinafter described.

A housing located at the rear end of the trailer and generally indicated at 47 contains the drive means for shafted head pulley 48, see FIGS. 3 and 4.

Said power head pulley 48 is disposed at the rear end portion of slot 28 and is journalled in spaced bearings such as indicated at 49 and 50, see FIGS. 3 and 5. Said bearings are supported on plates such as indicated at 51, which are secured to depending channels, such as indicated at 52 and 53, and 54 and 55 (not shown) on the other side of slot 28, which are in turn secured to the lower flanges of floor crossbeams such as indicated at 56 and 57.

A sprocket 58 is keyed to shaft 59 of shafted head pulley 48 to rotate therewith, see FIG. 3.

Said sprocket 58 is connected by a chain 61 to a sprocket 62 keyed to the output shaft 63 of gear reduction means 64.

On the input shaft 65 of said gear reduction means 64 is keyed a sheave 66 which is connected by belt 67 to variable speed pulley 68 keyed to the output shaft 69 of electric motor 71.

The gear reduction means 64 and electric motor 71 are mounted depending from plate 51 by any means.

Motor 71 with its variable speed pulley 68 is movably adjustable, see FIG. 3, through conventional hand controlled feed-screw means generally indicated at 72, from solid line position indicated at 73 to dotted line position indicated at 74.

Abutting the side edges of slot 28, and resting on the crossbeams 25, are a pair of elongated irregular section beams generally indicated at 75 and 76, see FIGS. 7 and 8, comprising an inverted channel portion such as indicated at 77, and two spaced and horizontally disposed flanges, flange 78 and interrupted flange 79 projecting inwardly from the side of said inverted channel and defining a channel or guideway 81 therewith. A flooring hold-down flange 82 projects outwardly from the top of channel portion 77 to hold down the adjacent flooring, firmly, said flooring being notched to receive said flange in interlocked relation. The irregular section beams 75 and 76 are secured to the floor crossbeams 25 by any means, such as welding, or the like.

The upper flange 78, hereinafter called the baffle flange, is continuous throughout its length; and the lower flange 79, hereinafter called the belt rider flange, is interrupted and discontinuous along its length, such as alternate flange sections 82, 83, 84 at the floor crossbeams 85, 86, 87, respectively, and the interalternate cut-away portions therebetween such as indicated at 88 and 89, see FIG. 6. Said cut-away portions extend substantially back to the channel 77 as indicated at 91, see FIG. 8.

Spaced intermediate the floor crossbeams are shafted belt-support-rollers such as indicated at 92, see FIGS. 6 and 7, journalled in spaced bearings such as indicated at 93 and 94, said bearings being mounted depending from the underside of the web of the inverted channel portions 77 of the irregular section beams 75 and 76, and secured thereto by any means. The tops of said rollers are disposed flush, or in the same plane as the top surfaces of the alternate belt rider flange sections.

An enclosure or housing is provided under the floor slot 28 to protect the entire length of the conveyor assembly from on-the-road foreign material such as dust, rain, ice, and snow, and the like. Such housing is generally indicated at 95, see FIGS. 6, 7, and 9.

The enclosure or housing 95 includes a plurality of series disposed drag pans 96 on which the return run of the conveyor belt, hereinafter described, slides and is supported. Said pans are shallow U-shaped sections having side flanges that are secured to the underside of housing side walls hereinafter described by means such as screws 97, see FIGS. 7 and 9. The main body portion on the drag pan is spaced from the underside of the floor beams to allow ample space for the conveyor belt to pass therebetween.

The tail end section 98 of the drag pans is hinged as at 99 to be swung open for periodic cleaning out of the space or reservoir 101. The drag pan sections at the tail end of the conveyor may be extended beyond tail and floor beam 31 to include one or more floor beams (not shown) thereby providing a greater reservoir or storage capacity for material to be collected therein. This would tend to collect material, such as leaked commodity, at a safe distance from the tail end pulley thereby preventing fouling thereof. The tail end drag pan 98 is provided with an end wall 102, flanged, and secured to the underside of floor crossbeam 31 by means of screws 103, thereby providing a tight end closure.

Side walls for the conveyor housing are provided such as indicated generally at 104, see FIGS. 7 and 9. These side walls comprise a body portion 105 configured to fit abutting the webs and flanges of the adjacent floor beams, flanged at the top 106 and bottom 107 for securement to the floor and drag pan, respectively, flanged at their ends 108 and 109 for securement to the webs of the adjacent floor beams, respectively, and secured by screws such as indicated at 111.

Thus the drag pans 95, the side walls 104, crossbeams 31 and the trailer floor provides the major portion of a housing for the conveyor assembly, protecting it underneath from the on-the-road dust or dirt that may be present.

An endless conveyor belt 112 is trained over the head end drive pulley 48 and the tail end pulley 29.

The upper working run of the belt rests on the plurality of belt-support-pulleys 92; and the belt is otherwise supported, at its side edge portions, in the guideways 81 and on the plurality of belt rider flange sections thereof such as indicated at 82, 83 and 84, see FIGS. 6, 8 and 10.

The belt is of a width less than the distance between the rearward margin of the cut-away portions such as at 88 and the rearward margin of the opposite cut-away portions on the opposite side of the floor slot. The difference in said dimensions provides a discharge space 113 between the side edges 112' of the belt 112 and the side margins 91 of said cut-away portions, see FIG. 10, to provide an opening through which commodity, such as grain, may fall through and away in the event a grain leakage should occur through the communicating space 114, see FIG. 8, between the belt and the adjacent upper baffle flanges 78, therabove, respectively.

Put another way, the side edges of the belt are spaced from the side margins 91 of the cut-away portions such as at 88 a distance sufficient to allow commodity such as grain to discharge through such space 113 in the event of grain leakage through anoher communicating space 114 between the top of the belt and the bottom of the baffle flange 78. Said leakage space 114 is reduced to a very minimum of belt operating clearance, and is preferred to have a vertical dimension equal to the diameter of a mustard seed, or one-sixteenth of an inch, or less, thereby to baffle or check the passage and leakage of such grain therethrough.

To further control such grain kernels as may escape through the baffle space 114 and fall through the discharge space 113, and to prevent such leakage grain from falling on an fouling the return run of the belt, there are provided a plurality of deflector plates such as at 115 and 116 disposed between the floor crossbeams and slotted to receive the lower flanges of such crossbeams, respectively, and which extend substantially the full length of the belt, and along both side edges thereof, see FIG. 7.

Said deflector plates are disposed sloping from a high point under and adjacent the outer edge portions of the upper working run of said belt and decline downwardly outwardly beyond the outer edges of the lower return run of said belt to a low point adjacent the drag pan. An abutting relation of the deflector plates with the drag pans such as at 117 see FIG. 7, and with the adjacent crossbeams as at 117' and with each other as at 117" see FIG. 6, provides a grain leak-proof seal and depository or compartment 120 see FIG. 7 to receive and store any leakage grain and to prevent such grain kernels working their way past such connection and onto the lower return run and fouling it. The deflector plates extend to the webs 118 of the floor crossbeams and are provided with flanges such as indicated at 119 which are secured to the webs by means such as screws 121, see FIG. 7.

A plurality of steel cover plate sections, such as indicated at 122, see FIGS. 6 and 7, are provided over the entire length of the slot 28. Said cover plates are provided with a handhole 123 for manually removing said cover plates to expose the conveyor belt as hereinafter described. Said cover plates are bodily removable, vertically, as indicated by the dotted line position 124. The cover plates rest on the inverted channel portion 77 and upper baffle flange 78 of the compound sections 75 and 76, respectively, and adapted to lay flush with the trailer floor 26 to provide a smooth uniform floor for the operation of fork lift trucks thereover.

A corner guide roller 125 is provided adjacent the head pulley 48, to guide and deflect the lower return run of the belt from a low position at the bottom of the hand pulley to the plane of the surface of the drag pans, on which the return run slides, such as indicated at 126, see FIGS. 5 and 4.

The shaft of the corner guide roller 125 is journalled in spaced bearings such as indicated at 127 slidably mounted in conventional screw type belt tightener means generally indicated at 128. Said belt tightener means is secured to plate 129 which in turn is secured to channels 52 and 53, and 54 and 55 (not shown) respectively.

The aforesaid conveyor housing is extended to enclose said corner guide roller and belt tightener means by chamber means generally indicated at 130.

The conveyor enclosure or housing terminates, at the head pulley 48, see FIG. 5, in a discharge compartment generally indicated at 131 comprising an end wall 132, two side walls 133 and 134, and a drop gate 135 hinged to the end wall as at 136 and extending from one side wall to the other side wall.

Said drop gate is latched in a horizontal closed position against stop 140 by conventional latch means generally indicated at 137 and swings downwardly to an open dotted line position indicated at 138.

The side walls 133 and 134 are closely disposed adjacent the head pulley and belt thereon, such as indicated at space 139, see FIG. 3, to prevent the escape of commodity such as grain from the upper work run of the belt, through such space between the belt and such side walls, and thence falling on the return lower run which might be fouled thereby.

The end and side walls of the discharge compartment 131 are secured to the underside of the trailer by any conventional means (not shown).

The trailer is provided with a conventional sliding tandem asembly generally indicated at 141 having a latch bar 142, see FIGS. 1 and 7. The conveyor housing is shown spaced above the crossbeam 143 of the sliding tandem by a clearance 144, thereby showing the applicability of the invention to trailers embodying sliding tandems. The tandem slides on the surfaces indicated at 145.

Operation

When bulk commodity such as grain or the like is to be hauled, the cover plates 122 are first placed across the slot 28 closing said slot completely except for the rearmost cover plate 146, see FIG. 5, which is disposed in the dotted line position 147, thereby leaving a small portion of the slot end unclosed and open as indicated at the arrow 148.

The grain is then loaded into the trailer by any conventional method, such as through the rear door or from the top, some of the grain passing through slot opening 148, filling discharge chamber 149, and being supported on closed drop door 135 which is grain sealed around its edges by any conventional means, if necessary.

In unloading the grain, latch means 137 is actuated, the drop door consequently released, and gravity swung to its open position 138.

The grain at the rear end of the trailer will then flow downwardly from the trailer into a pit, hopper, portable conveyor, or the like, provided to receive such grain.

When the grain at the rear of the trailer is thus gravity discharged, the rear door 22 of the trailer is carefully opened and the cover plate 146 is completely removed thereby exposing the conveyor belt at the head pulley.

The electric motor driven conveyor is then started to operate, and the grain on the belt is brought to the rear of the trailer and is gravity discharged from the head end of the conveyor, donwwardly, through the discharge housing 131, and into any receiving means provided therebelow.

As each succeeding cover plate is exposed, it is removed, until the trailer has been emptied. The cover plates are then restored to close the slot, and the trailer readied for the next bulk shipment.

As the upper run of the belt works to convey the grain toward the rear of the trailer, some of the smaller sized kernels may work their way into and through the space 114 between the baffle flange 78 and the side edge portions of the conveyor belt disposed closely adjacent therebelow, see FIG. 8.

Such leakage kernels will fall through provided discharge openings 113, see FIG. 10, and unto deflector plates such as 115 or 116 and deflected away from the lower return run of the belt and deposited into a receiver or receptacle zone such as along the side portions of the drag pans.

Such leakage grains are thus recovered. They can be removed by air blasts, preferably directing them toward the tail end of the conveyor and into the reservoir 101 from which they can be discharged through hinged door 98.

The present conveyor can be readily adapted and installed in conventional trailers by merely removing a setcion of the flooring along the longitudinal centerline of such trailer, and installing the conveyor thereat and therein.

Some characteristic features of this invention are the provision of deflector plates disposed under the side edge portions of the upper work run of the conveyor belt and declining outwardly to intercept and convey any leakage grain away from the lower run and into a receptacle; the provision of a baffle flange or rib disposed closely adjacent the side edge portions of the upper run of the conveyor belt to prevent any grain escaping thereby; and the provision of guideway means to bafflingly receive and support the outer edge portions of the upper run of the conveyor belt, said guideway means having openings through which any baffle leakage grain may fall through.

What is claimed and desired to be protected by Letters Patent of the United States is:

1. A conveyor for bulk grain hauling vehicles having spaced crossbeams supporting the floor thereof, comprising:
    (a) a pair of longitudinal spaced parallel beams supported on said crossbeams, said longitudinal beams having a pair of corresponding spaced parallel horizontal flanges projecting toward each other, said flanges comprising an upper continuous baffle flange and a lower interrupted belt rider flange, the lower belt rider flange having alternate flange sections and interalternate cut-away portions;
    (b) belt-support-rollers journalled at said cut-away portions, the upper surface of said rollers being substantially on a plane with the upper surface of said lower belt rider flange;
    (c) drag pan means spaced below said crossbeams, and disposed under and extending along said longitudinal beams, and secured to the underside of said vehicle;
    (d) a tail pulley journalled at the forward end of said longitudinal beams, the upper surface of said tail pulley being substantially on a plane with the upper surfaces of said lower belt rider flange;
    (e) a head pulley journalled at the rearward end of said longitudinal beams, the upper surface of said head pulley being substantially on a plane with the upper surface of said lower belt rider flange;
    (f) an endless conveyor belt trained around said head pulley and said tail pulley, the upper run of said belt being supported on said belt-support-rollers and on said belt rider flange, and the lower run of said belt being supported on said drag pan means, said belt being of a width having its side edges spaced inwardly from the side margins of the cut-away portions of said belt rider flange to provide a grain discharge openings therebetween, and the distance between the top surface of the belt and the adjacent lower surface of the upper baffle flange being of a dimension to baffle grain;
    (g) drive means for driving said head pulley;
    (h) and a series of removable cover plates, over said belt, resting on said longitudinal beams.

2. The conveyor of claim 1 and interceptor means disposed under and along the side edge portions of the upper run of said belt and secured to the floor crossbeams and adapted to receive grain from said grain discharge openings.

3. The conveyor of claim 1 and deflector plates disposed under and along the side edge portions of the upper run of said belt and secured to the floor crossbeams, said deflector plates being disposed sloping from a high point adjacent the underside of the upper run of said belt to a low point outwardly beyond the corresponding outer edge of the lower run of the belt.

4. The conveyor of claim 3 wherein the lower edge of the deflector plates abut the drag pan, and the side edges of the deflector plates abut the adjacent crossbeams, and each other, in grain leak-proof seal.

5. The conveyor of claim 2 and housing means, including said drag pan means, for protecting said conveyor assembly from on-the-road dust, dirt, and weather.

6. The conveyor of claim 5 wherein the drag pan means includes a removable section thereof, at the tail pulley, for periodic clean out.

7. The conveyor of claim 5 wherein the housing means, at the head pulley, terminates in a discharge compartment having movable gate means movable from an open to a closed position.

8. The conveyor of claim 7 wherein the compartment includes side walls disposed adjacent the side edges of said belt to prevent grain escaping between said side walls and the side edges of said belt.

9. The conveyor of claim 4 and housing means, including said drag pan means, for protecting said conveyor assembly from on-the-road dust, dirt, and weather, wherein the drag pan means includes a removable section thereof, at the tail pulley, for periodic clean out; and wherein the housing means, at the head pulley, terminates in a discharge compartment having side walls disposed adjacent the side edges of said belt to prevent grain escaping between said side walls and the side edges of said belt, and having a drop gate hinged at one of the walls of said compartment and swingable from a substantially horizontal closed position to a substantially vertical downward open position, and latch means for securing said drop gate in said closed position.

10. The conveyor of claim 1 wherein the distance between the top surface of the belt and the adjacent lower surface of the upper baffle flange is substantially one-sixteenth of an inch.

11. The conveyor of claim 1 wherein the distance between the top surface of the belt and the adjacent lower surface of the upper baffle flange is less than one-sixteenth of an inch.

References Cited
UNITED STATES PATENTS

| | | | |
|---|---|---|---|
| 3,000,521 | 9/1961 | Deputy | 214—83.36 XR |
| 3,107,804 | 10/1963 | Cox | 214—83.36 XR |
| 3,317,066 | 5/1967 | Hamm | 214—83.36 |

ALBERT J. MAKAY, Primary Examiner

U.S. Cl. X.R.

198—204; 214—83.36